(12) United States Patent
Dombro, Jr.

(10) Patent No.: US 8,734,667 B2
(45) Date of Patent: May 27, 2014

(54) ELECTROLYTE FOR HIGH VOLTAGE ELECTROLYTIC CAPACITORS AND METHODS

(75) Inventor: Ronald A. Dombro, Jr., St. Paul, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 316 days.

(21) Appl. No.: 13/043,339

(22) Filed: Mar. 8, 2011

(65) Prior Publication Data

US 2011/0242733 A1 Oct. 6, 2011

Related U.S. Application Data

(60) Provisional application No. 61/321,292, filed on Apr. 6, 2010.

(51) Int. Cl.
*H01G 9/035* (2006.01)

(52) U.S. Cl.
USPC .......... 252/62.2; 361/503; 361/504; 361/506; 607/5

(58) Field of Classification Search
USPC .............. 252/62.2; 361/503, 504, 506; 607/5
See application file for complete search history.

(56) References Cited

U.S. PATENT DOCUMENTS

| | | | |
|---|---|---|---|
| 4,734,821 A * | 3/1988 | Morimoto et al. | 361/527 |
| 4,810,400 A | 3/1989 | Shinozaki et al. | |
| 4,860,169 A | 8/1989 | Dapo | |
| 4,915,861 A | 4/1990 | Yokoyama et al. | |
| 5,111,365 A | 5/1992 | Dapo | |
| 6,522,524 B1 * | 2/2003 | Feger et al. | 361/506 |
| 7,072,173 B2 | 7/2006 | Takeda et al. | |
| 2005/0117276 A1 * | 6/2005 | Liu et al. | 361/504 |
| 2008/0083626 A1 | 4/2008 | Kubo et al. | |
| 2010/0142124 A1 | 6/2010 | Dreissig et al. | |

FOREIGN PATENT DOCUMENTS

| | | |
|---|---|---|
| EP | 1394824 A1 | 3/2004 |
| EP | 1437749 A1 | 7/2004 |
| JP | 2002100539 A | 4/2002 |

OTHER PUBLICATIONS

"Introduction to Aluminum Electrolytic Capacitors", http://www.faradnet.com/, (Downloaded Feb. 11, 2011).

"Introduction to Aluminum Electrolytic Capacitors—How Capacitors Work", http://www.elna.co.jp/en/capacitor/alumi/principle.html, Elna Co., (Downloaded Feb. 11, 2011).

Alwitt, R. S, et al., "Electrical instability of composite aluminum oxide films", Electrochimica Acta, 23(4), (Apr. 1978), 355-362.

(Continued)

*Primary Examiner* — Carol M Koslow
(74) *Attorney, Agent, or Firm* — Schwegman Lundberg & Woessner, P.A.

(57) ABSTRACT

This disclosure relates to an electrolyte for an aluminum electrolytic capacitor. An electrolyte according to one embodiment includes a protic fluid and a high dielectric co-solvent or a dipolar aprotic. According to various embodiments, the electrolyte is pH buffered to less than approximately 6.8 pH. The protic fluid includes ethylene glycol and the high dielectric co-solvent includes N-methylformamide, in various embodiments. The disclosure further relates to methods for manufacturing an electrolyte, and capacitors and implantable devices including a supporting electrolyte selected for optimal cation size and charge and anion solubility.

17 Claims, 6 Drawing Sheets

(56) References Cited

OTHER PUBLICATIONS

Chang, Jeng-Kuei, et al., "Effect of Heat-Treatment on Characteristics of Anodized Aluminum Oxide Formed in Ammonium Adipate Solution", J. Electrochem. Soc., 151(3), (2004), B188-B194.

Chang, Jeng-Kuei, et al., "Material characteristics and capacitive properties of aluminum anodic oxides formed in various electrolytes", Journal of Materials Research, 19(11), (2004), 3364-3373.

Dolui, B. K, et al., "Autoprotolysis constants of ethylene glycol in isodielectric mixtures of ethylene glycol and N,N-dimethyl formamide at 298.15 K and the related Gibbs energies of transfer", Indian Journal of Chemistry, 46A, (2007), 1081.

Izutsu, Kosuke, "Use of Non-Aqueous Solutions in Modern Electrochemical Technologies", Electrochemistry in nonaqueous solutions, Weinheim, Germany : Wiley-VCH, (2002), 317.

Shimizu, K., et al., "Impurity distributions in barrier anodic films on aluminium: a GDOES depth profiling study", Electrochimica Acta, 44(13), (Feb. 15, 1999), 2297-2306.

Ue, M., et al., "Anodic Oxidation of Aluminum in Organic Electrolytes under Nearly Anhydrous Conditions", J. Electrochem. Soc., 142, (1995), 2266-2271.

"International Application Serial No. PCT/US2011/027595, Int'l Search Report mailed Nov. 17, 2011", 4 pgs.

"International Application Serial No. PCT/US2011/027595, International Preliminary Report on Patentability mailed Oct. 18, 2012", 7 pgs.

"International Application Serial No. PCT/US2011/027595, Written Opinion mailed Nov. 17, 2011", 5 pgs.

\* cited by examiner

ELECTROLYTE FOR HIGH VOLTAGE ELECTROLYTIC CAPACITORS AND METHODS

CLAIM OF PRIORITY

This application claims the benefit of priority under 35 U.S.C. §119(e) of U.S. Provisional Patent Application Ser. No. 61/321,292, filed on Apr. 6, 2010, which is herein incorporated by reference in its entirety.

TECHNICAL FIELD

This document relates generally to energy storage and particularly to an electrolyte for high voltage electrolytic capacitors to store energy in an implantable medical device.

BACKGROUND

Electrical stimulation therapy has been found to benefit some patients. For example, some patients suffer from an irregular heartbeat or arrhythmia and may benefit from application of electrical stimulation to the heart. Some patients suffer from a particular type of arrhythmia called a fibrillation. Fibrillations may affect different regions of the heart, such as the atria or the ventricles. When a fibrillation occurs in the ventricles, the heart's ability to pump blood is dramatically reduced, putting the patient at risk of harm. It has been found that applying an electrical stimulation to the patient can effectively treat patients suffering disorders such as from fibrillation by restoring a regular heartbeat.

Implantable devices are used to provide pulses to a user. Cardiac rhythm management devices are among these. There are several ongoing needs which pressure designers to improve capacitors used in implantable devices. Smaller size is needed. Smaller devices are easier to implant and are less invasive. Smaller devices can result from smaller capacitors.

SUMMARY

This disclosure relates to an electrolyte for an aluminum electrolytic capacitor. An electrolyte according to one embodiment includes a protic fluid and a high dielectric co-solvent. According to various embodiments, the electrolyte is pH buffered to less than approximately 6.8 pH. The protic fluid includes ethylene glycol and the high dielectric co-solvent includes N-methylformamide, in various embodiments. The supporting electrolyte is selected for optimal cation size and charge and anion solubility.

One aspect of the present subject matter includes an electrolytic capacitor. The capacitor includes an anode, a cathode and an electrolyte provided between the anode and the cathode. The electrolyte includes a protic fluid and a high dielectric co-solvent or a dipolar aprotic. The electrolyte is pH buffered to less than approximately 6.8 pH, in various embodiments.

One aspect of the present subject matter includes an implantable device. The implantable device includes an implantable device housing, an electrolytic capacitor disposed in the implantable device housing, and pulse control electronics disposed in the implantable device housing and connected to the capacitor. According to various embodiments, the capacitor includes an electrolyte, the electrolyte including a protic fluid and a high dielectric co-solvent. The electrolyte is pH buffered to less than approximately 6.8 pH, according to various embodiments.

One aspect of the present subject matter includes a method of manufacturing an electrolyte for an aluminum electrolytic capacitor. An embodiment of the method includes providing a protic fluid and mixing a high dielectric co-solvent with the protic fluid to form a mixed solvent. A pH of the mixed solvent is buffered to less than approximately 6.8 pH using a buffering anionic agent, such as borate, in various embodiments.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof. The scope of the present invention is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than an embodiment. The following detailed description is, therefore, not to be taken in a limiting sense, and the scope is defined only by the appended claims, along with the full scope of legal equivalents to which such claims are entitled.

Energy storage capacitors are used with implantable devices to provide stimulation energy. What is needed is to increase the energy storage of such capacitors while also reducing the size of the capacitors. The present disclosure relates to an electrolyte for an aluminum electrolytic capacitor. The supporting electrolyte is selected for optimal cation size and charge and anion solubility. An electrolyte according to one embodiment includes a protic fluid and a high dielectric co-solvent. According to various embodiments, the electrolyte is pH buffered to less than approximately 6.8 pH. The protic fluid includes ethylene glycol and the high dielectric co-solvent includes N-methylformamide, in various embodiments. A capacitance and energy density increase is realized using the electrolyte. This results in a reduction in the volume of the capacitor needed for the same energy storage capacity.

Figure 1:
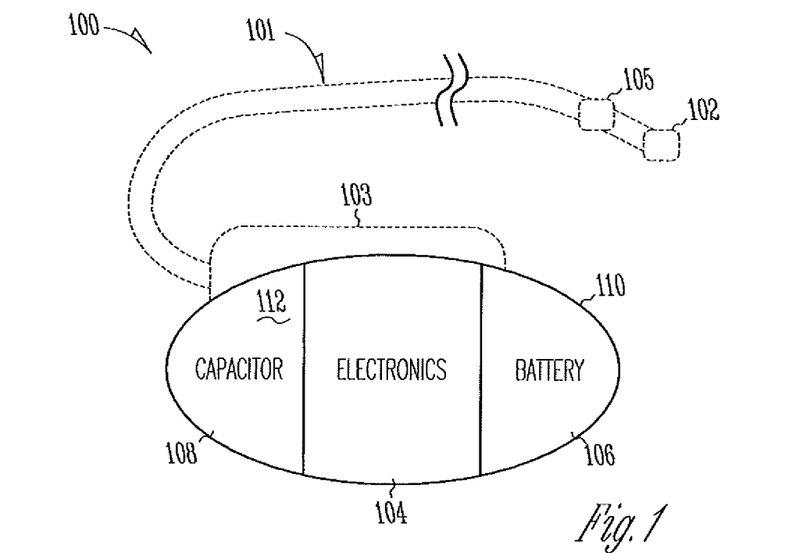
FIG. 1 is a schematic of a medical system including an electrolytic capacitor, according to some embodiments.

FIG. 1 is a schematic of a medical system 100 including an electrolytic capacitor, according to some embodiments. The medical system 100 represents any number of systems to provide therapeutic stimulus, such as to a heart. Examples of medical systems include, but are not limited to, implantable pacemakers, implantable defibrillators, implantable nerve stimulation devices and devices that provide stimulation from outside the body, including, but not limited to, external defibrillators.

Electronics 104 are to monitor the patient, such as by monitoring a sensor 105, and to monitor and control activity within the system 100. In some examples, the electronics 104 are to monitor a patient, diagnose a condition to be treated such as an arrhythmia, and control delivery of a stimulation pulse of energy to the patient. The electronics 104 can be recharged wirelessly using an inductor. Alternatively, the electronics 104 can be powered by a battery 106. In some examples, electronics 104 are to direct small therapeutic bursts of energy to a patient from the battery 106.

For therapies, such as defibrillation, that use energy discharge rates exceeding what battery 106 is able to provide, a capacitor 108 is used. Energy from the battery 106 is controlled by the electronics 104 to charge the capacitor 108. The capacitor 108 is controlled by the electronics 104 to discharge to a patient to treat the patient. In some examples, the capacitor 108 is switched on to provide therapeutic energy and switched off to truncate therapy delivery.

Some examples of a medical system 100 include a lead system 101. In certain instances, after implantation, the lead system 101 or a portion of the lead system 101 is in electrical communication with tissue to be stimulated. For example, some configurations of lead system 101 contact tissue with a stimulation electrode 102. The lead system 101 couples to other portions of the system 100 via a connection in a header 103. Examples of the system 101 use different numbers of stimulation electrodes and/or sensors in accordance with the needs of the therapy to be performed.

Additional examples function without a lead 101. Leadless examples can be positioned in contact with the tissue to be stimulated, or can be positioned proximal to tissue to shock the tissue to be stimulated through intermediary tissue. Leadless examples can be easier to implant and can be less expensive as they do not require the additional lead components.

In certain embodiments, the electronics 104 include an electronic cardiac rhythm management circuit coupled to the battery 106 and the capacitor 108 to discharge the capacitor 108 to provide a therapeutic defibrillation pulse. In some examples, the system 100 includes an anode and a cathode sized to deliver a defibrillation pulse of at least approximately 50 joules. Other configurations can deliver larger amounts of energy. Some configurations deliver less energy. In some examples, the energy level is predetermined to achieve a delivered energy level mandated by a governing body or standard associated with a geographic region, such as a European country. In an additional embodiment, the anode and cathode are sized to deliver a defibrillation pulse of at least approximately 60 joules. In some examples, this energy level is predetermined to achieve an energy level mandated by a governing body of another region, such as the United States. In some examples, electronics 104 are to control discharge of a defibrillation pulse so that the medical system 100 delivers only the energy mandated by the region in which the system 100 is used. In some examples, a pulse of 36 joules is delivered.

Packaging anodes and cathodes can reduce their efficiency. Interconnections between conductors coupled to electronics and to the electrodes of the capacitor 108 decrease efficiency, for example. Accordingly, anodes and cathodes are sized to compensate for decreases in efficiency. As such, in some embodiments, the capacitor 108 includes anodes and cathodes sized and packaged to deliver a defibrillation pulse of at least approximately 50 joules. Some are sized and packaged to deliver a defibrillation pulse of at least approximately 60 joules.

In certain examples, the capacitor 108 includes a capacitor case 112 sealed to retain electrolyte. In some examples, the capacitor case 112 is welded. In some instances, the capacitor case 112 is hermetically sealed. In additional examples, the capacitor case 112 is sealed to retain electrolyte, but is sealed with a seal to allow flow of other matter, such as gaseous diatomic hydrogen or a helium molecule. Some of these examples use an epoxy seal.

A hermetically sealed device housing 110 is used to house components, such as the battery 106, the electronics 104, and the capacitor 108. Hermeticity is provided by welding components into the hermetically sealed device housing 110, in some examples. Other examples bond portions of the housing 110 together with an adhesive such as a resin based adhesive such as epoxy. Accordingly, some examples of the housing 110 include an epoxy sealed seam or port. Several materials can be used to form housing 110, including, but not limited to, titanium, stainless steel, nickel, a polymeric material, or combinations of these materials. In various examples, the housing 110 and the case 112 are biocompatible.

The capacitor 108 is improved by the present electrolyte technology in part because it can be made with smaller dimensions. The improvement provided by these electrodes is pertinent to applications where high-energy, high-voltage, or space-efficient capacitors are desirable, including, but not limited to, capacitors used for photographic flash equipment. The present subject matter extends to energy storage devices that benefit from high surface area electrodes including, but not limited to, aluminum. The electrodes described here can be incorporated into cylindrical capacitors that are wound, in addition to stacked capacitors.

Figure 2:
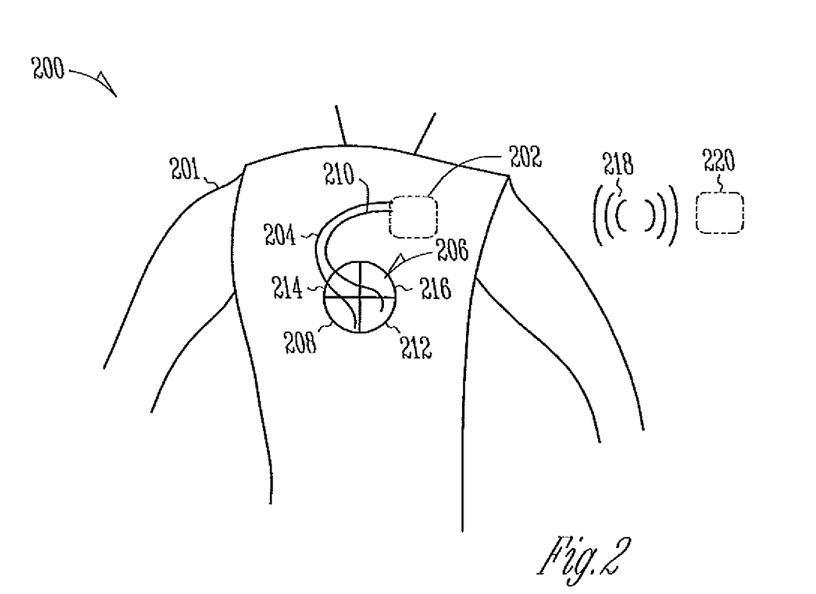
FIG. 2 is an implanted medical system including an electrolytic capacitor, according to some embodiments.

FIG. 2 is an implanted medical system 200, implanted in a patient 201, and including an electrolytic capacitor, according to some embodiments. The system includes a cardiac rhythm management device 202 coupled to a first lead 204 to extend through the heart 206 to the right ventricle 208 to stimulate at least the right ventricle 208. The system also includes a second lead 210 to extend through the heart 206 to the left ventricle 212. In various embodiments, one or both of the first lead 204 and the second lead 210 include electrodes to sense intrinsic heart signals and to stimulate the heart. The first lead 204 is in direct contact (e.g., touching) with the right atrium 214 and the right ventricle 208 to sense and/or stimulate both those tissue regions. The second lead 210 is in direct contact with the left atrium 216 and the left ventricle 212 to sense and/or stimulate both those tissue regions. The cardiac rhythm management device 202 uses the lead electrodes to deliver energy to the heart, either between electrodes on the leads or between one or more lead electrodes and the cardiac rhythm management device 202. In some examples, the cardiac rhythm management device 202 is programmable and wirelessly communicates 218 programming information with a programmer 220. In some examples, the programmer 220 wirelessly 218 charges an energy storage device of the cardiac rhythm management device 202.

The capacitor includes an anode and a cathode separated by a dielectric. The capacitor may be coupled to electronics adapted to charge the capacitor and use the energy for various purposes such as delivering therapy via an implantable medical device. In various embodiments, a capacitor element includes a number of electrodes, including a number of cathode stacks and a number of anode layers. In various embodiments, the electrodes include foil, such as an aluminum foil.

An apparatus having enhanced properties for electrolytic capacitors to store energy in an implantable medical device is provided. An apparatus according to one embodiment includes an implantable device housing and a capacitor disposed in the implantable device housing. The capacitor includes an electrolyte, the electrolyte including a protic fluid and a high dielectric co-solvent. The electrolyte is pH buffered to less than approximately 6.8 pH, according to various embodiments. An embodiment of the apparatus includes pulse control electronics disposed in the implantable device housing and connected to the capacitor.

The capacitance of an aluminum electrolytic capacitor (AEC) is proportional to the capacitance of the barrier alumina film on the anode and the cathode double layer capacitance. To increase the capacitance and energy density of the AEC, the present subject matter provides an electrolyte that uses a mixed solvent of ethylene glycol with a high dielectric constant co-solvent and optimized choice of cation supporting electrolyte that increases the capacitance and energy density by greater than approximately 20%. This increase capacitance significantly decreases the required size of the capacitor. Minimizing the footprint or size of the capacitor is important in many applications, including but not limited to implantable devices.

Previous efforts to increase the capacitance by electrolyte changes have met with reduction in the working voltage (breakdown voltage) of the electrolyte below that required in certain applications, or reduction in the conductivity that significantly reduces the energy efficiency of the capacitor. The present subject matter maintains or improves these properties while also increasing the cathode double layer capacitance, by providing an electrolyte for an aluminum electrolytic capacitor that improves the total capacitance of the capacitor. According to various embodiments, the electrolyte includes a mixed solvent containing a protic fluid, such as ethylene glycol with a high dielectric co-solvent, such as N-methylformamide. The solution is made from trialkylammonium carboxylates/dicarboxylates or quaternary ammonium carboxylates/dicarboxylates with an organic soluble supporting electrolyte, such as lithium salicylate, in various embodiments. In various embodiments, the electrolyte includes mixtures of protic fluid (such as ethylene glycol or diethylene glycol) and high dielectric protophilic (such as n-methylformamide or formamide) and/or dipolar aprotic (such as n,n-dimethylformamide or pyridine) with ammonium, quaternary ammonium and tertiary amine dicarboxylates and borates with an added supporting electrolyte of low ionic size cation (such as Li+, Mn(2+), Mg (2+) or Al (3+)) and organic or inorganic anion soluble in solution of the mixed co-solvent (such as 3,5 diiodosalicylate, tetrafluoroborate, acetate, diisopropylamide, succinate, lactate, benzoate or tetraborate).

Compatibility of the electrolyte with the barrier film is shown by the measured breakdown voltage performance. The conductivity of the electrolyte is maintained in an acceptable range (>1.0 mS/cm), in various embodiments. Mono or multi-charge cations with low ion radius, along with the high dielectric mixed solvent, increase the cathode double layer capacitance and therefore improve capacitor energy density, in various embodiments. The electrolyte of the present subject matter can be used in any high voltage capacitor application where size and energy density are important, including but not limited to implantable medical devices.

The total capacitance of an aluminum electrolytic capacitor, C, is the series sum of the anode and cathode capacitances and double layer capacitances, $C_c$, $C_{c,dl}$, $C_{a,dl}$, and $C_a$.

$$C = \frac{1}{\frac{1}{C_c} + \frac{1}{C_{c,dl}} + \frac{1}{C_{a,dl}} + \frac{1}{C_a}}$$

The ideal capacitance is the smallest of the four capacitances. Because of the respective magnitude, cathode double layer capacitance can have a relatively large effect on the total capacitance, as shown in the following table:

| $C_{c,dl}$ (µF) | % $C_{c,dl}$ increase | C (µF) | % C increase |
|---|---|---|---|
| 1500 | 0 | 300 | 0 |
| 3000 | 100 | 333 | 11.0 |
| 4500 | 200 | 346 | 15.4 |
| 6000 | 300 | 353 | 17.7 |

The increases in capacitance shown in the table translate directly into energy density increases through the following equation:

$$\text{Energy} = \tfrac{1}{2}CV^2$$

Thus, increasing capacitance allows for the same energy delivery from a proportionally smaller capacitor. The present subject matter provides for an improved cathode double layer capacitance by the use of a high voltage electrolyte, the electrolyte including high dielectric co-solvents and double layer enhancing cation supporting electrolytes. An example of a high voltage electrolyte used in AECs is a solution of tertiary ammonium dicarboxylates in an amphiprotic neutral solvent such as ethylene glycol (EG). EG is used as solvent because of its electrochemical stability and compatibility with the barrier aluminum oxide film, $Al_2O_3$, formed on the anode surface. Borates are added to buffer the solution in the pH=7.0 range to minimize the evolution of hydrogen gas at the cathode in the charging cycle, which results in capacitor swelling. For this reason, protons (H+) do not improve the cathode double layer capacitance. A high pH can develop at the cathode when the buffer is not present.

Figure 3A:
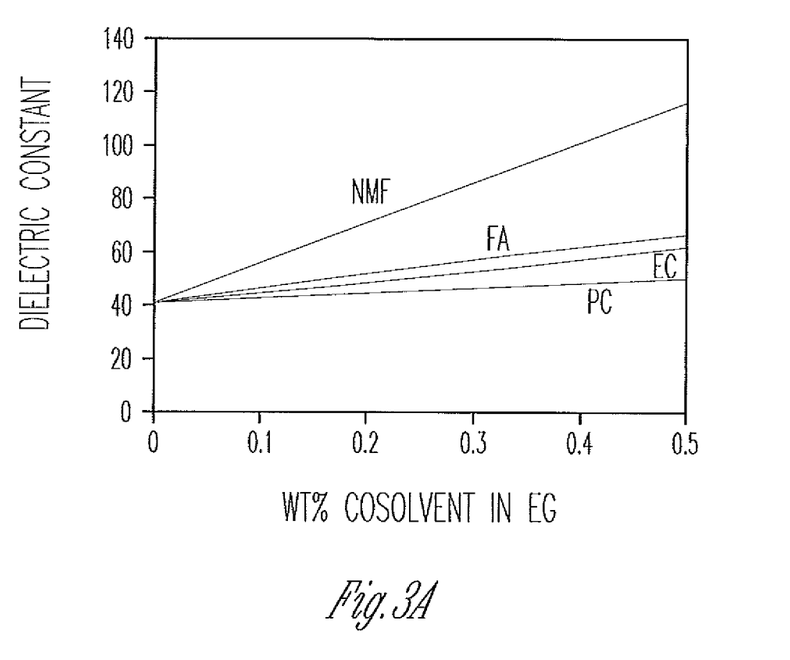
FIGS. 3A-3D are graphical illustrations of properties of solvents used in an electrolyte solution, according to some embodiments.
Figure 3B:
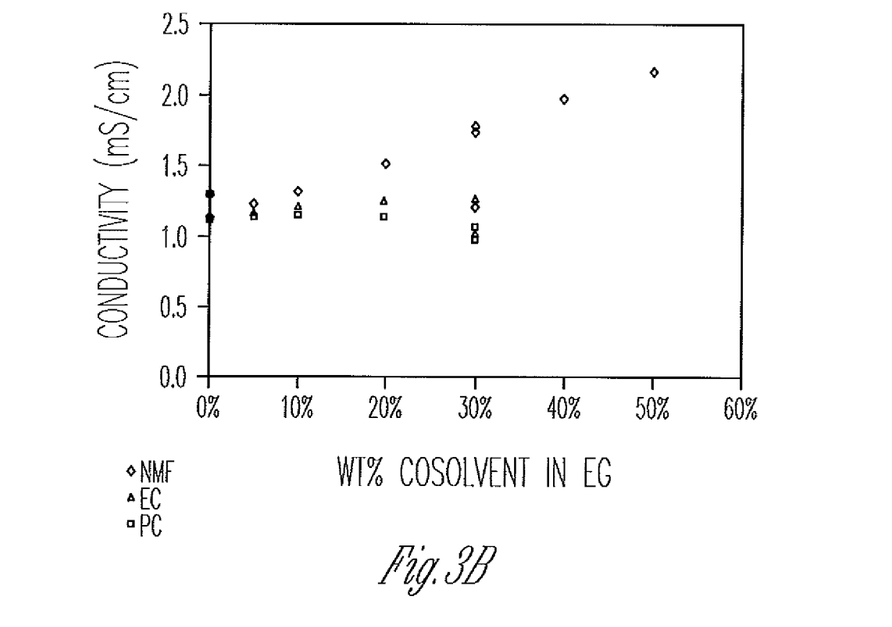
Figure 3C:
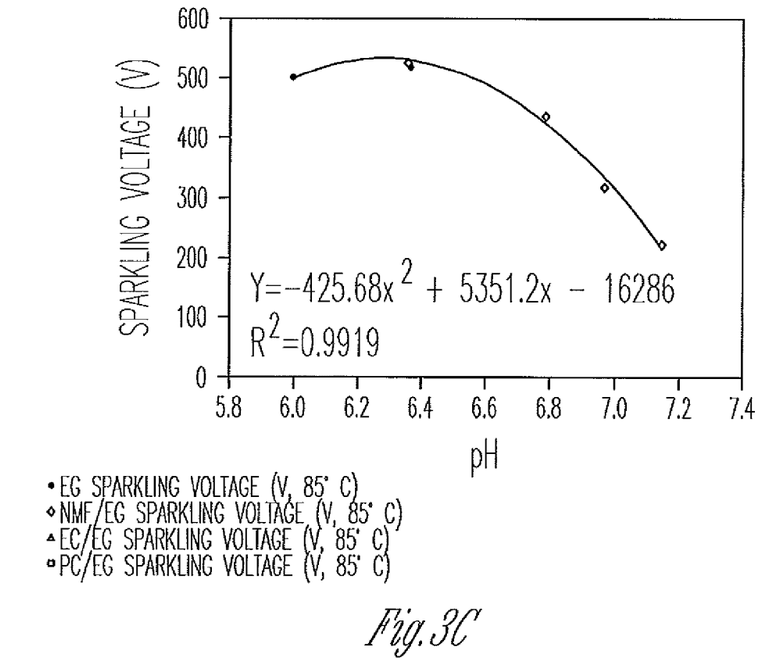

The stability of the $Al_2O_3$ barrier film in an AEC is sensitive to the electrolyte composition. Electrochemical reforming, which is the practice of repairing the film as defects develop over time, can cause the film to incorporate anions into voids. These anions can adversely affect the reformation characteristics of the film and the working voltage of the capacitor. EG based solutions promote low leakage currents and barrier films with acceptable breakdown voltage characteristics. A drawback of using EG as a solvent is its dielectric constant (37.7) that limits the capability to improve the cathode double layer capacitance. Alternative protophilic organic solvents that have high dielectric constants include propylene carbonate (PC), ethylene carbonate (EC), formamide (FA), and n-methylformamide (NMF). However, these solvents alone have been determined to have insufficient breakdown voltage properties. FIG. 3A is a chart of the dielectric constant calculated as a function of co-solvent percentage of the above solvents in EG. The NMF co-solvent has the greatest dielectric constant, followed by EC and PC. Other relevant measures include conductivity, pH, and sparking voltage (breakdown voltage). The conductivity of the mixtures of EG with the co-solvents is shown in FIG. 3B. The NMF mixture with EG produced the highest conductivity. As the percentage of the protophilic dipolar solvent is increased, the pH also increases. The effect of pH of the EG based electrolytes on the sparking voltages is shown in FIG. 3C. Higher voltage behavior is controlled by keeping the pH below approximately 6.7 to 6.8.

Figure 3D:
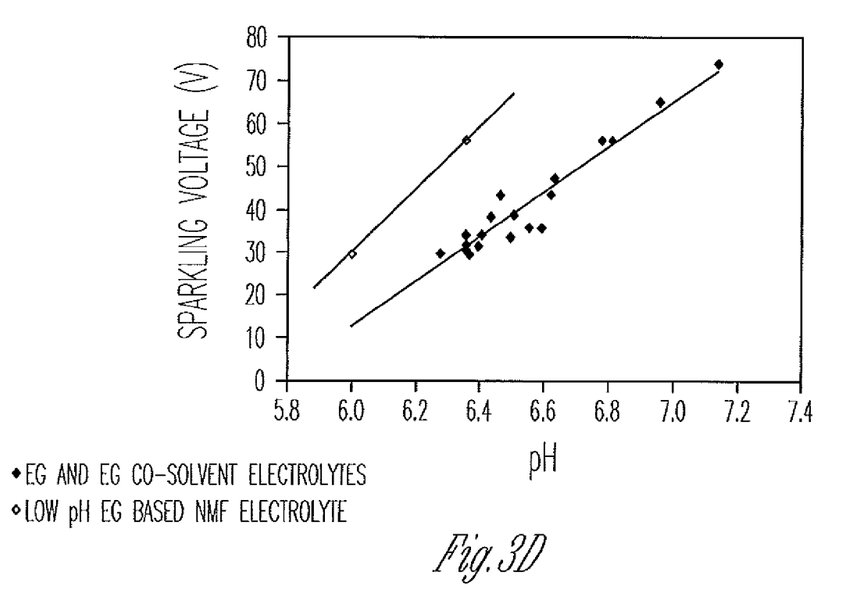

FIG. 3D shows a plot of the calculated dielectric constant versus pH. The results indicate that a high dielectric constant solvent with relatively low pH provides a high conductivity, high sparking voltage electrolyte solvent that can be formulated using mixtures of NMF in EG at concentration of NMF less than approximately 30%. These mixtures can be used to provide high dielectric constant solvent for increased cathode double layer capacitance, according to various embodiments.

Cathode double layer capacitance is modeled as an inner Helmholtz plane and an outer diffuse layer. Cathode double layer capacitance increases with solvent dielectric constant, the cation charge, and the cation concentration, and decreases with cation size. According to the present subject matter, using a higher dielectric solvent and adding a supporting electrolyte containing a cation with smaller ionic radius and/or a greater charge can significantly increase the cathode double layer capacitance. An improvement in cathode double layer capacitance of 300% results in an increase in the total capacitance and energy of the capacitor by almost 18%. Using a high dielectric co-solvent such as NMF in EG, and adding a small single or multi-charged cation improves double layer capacitance, in various embodiments. For example, by using a lithium cation supporting electrolyte, such as lithium 3,5-diiodosalicylate, lithium tetrafluoroborate, lithium acetate, lithium diisopropylamide, lithium succinate, lithium lactate, lithium benzoate or lithium tetraborate in a 20:80 NMF/EG solution, the total capacitance of a capacitor can be increased. Other cation supporting electrolytes can also be used. The following table shows improvements in total capacitance compared to ammonium/EG based electrolytes:

|        | radius | r/r(NH4+) | Ctotal |
|--------|--------|-----------|--------|
| NH4+   | 0.145  | 1.00      | 292.6  |
| Ba(2+) | 0.143  | 0.99      | 293.4  |
| K+     | 0.133  | 0.92      | 297.7  |
| Pb(2+) | 0.132  | 0.91      | 298.1  |
| Sr(2+) | 0.127  | 0.88      | 300.3  |
| La(3+) | 0.122  | 0.84      | 302.5  |
| Ag+    | 0.113  | 0.78      | 306.6  |
| Hg(2+) | 0.112  | 0.77      | 307.1  |
| Ca(2+) | 0.106  | 0.73      | 309.9  |
| Cd(2+) | 0.103  | 0.71      | 311.3  |
| Na+    | 0.098  | 0.68      | 313.7  |
| Cu+    | 0.096  | 0.66      | 314.7  |
| Mn(2+) | 0.091  | 0.63      | 317.1  |
| Zn(2+) | 0.083  | 0.57      | 321.1  |
| Fe(2+) | 0.083  | 0.57      | 321.1  |
| Co(2+) | 0.082  | 0.57      | 321.6  |
| Li+    | 0.078  | 0.54      | 323.6  |
| Mg(2+) | 0.078  | 0.54      | 323.6  |
| Cu(2+) | 0.072  | 0.50      | 326.8  |
| Ni(2+) | 0.067  | 0.46      | 329.4  |
| Fe(3+) | 0.067  | 0.46      | 329.4  |
| Ti(3+) | 0.064  | 0.44      | 331.0  |
| Al(3+) | 0.057  | 0.39      | 334.8  |
| Be(2+) | 0.034  | 0.23      | 347.9  |

Figure 4A:
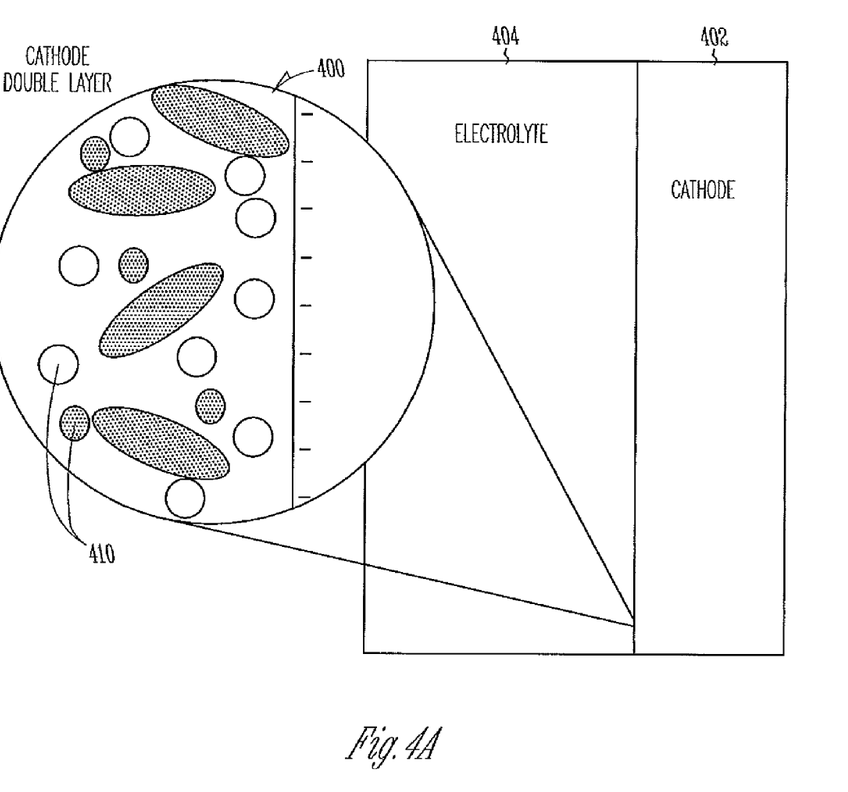
FIG. 4A illustrates an electrolyte for an aluminum electrolytic capacitor, according to various embodiments.
Figure 4B:
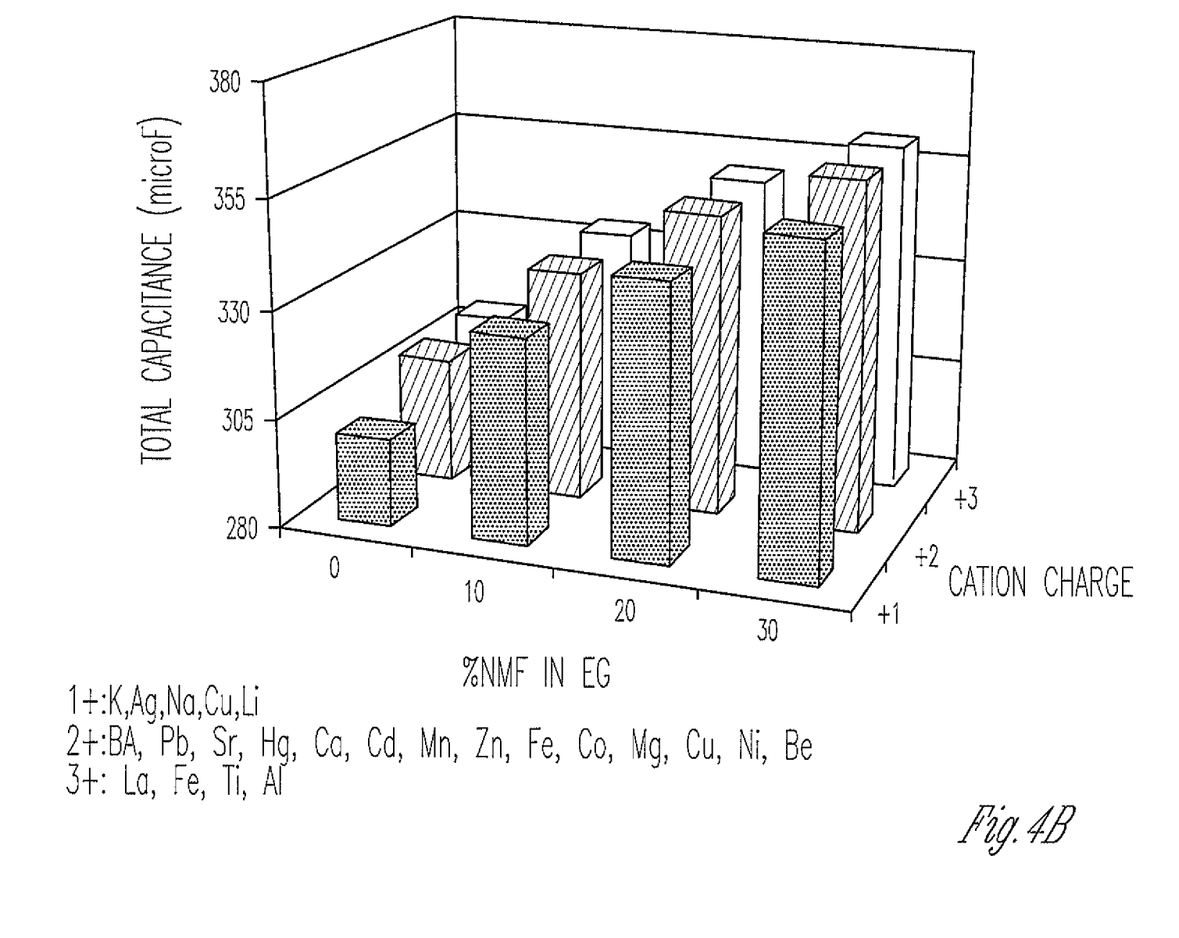
FIG. 4B is a graphical illustration of cathode double layer capacitance using an improved electrolyte solution, according to some embodiments.

According to various embodiments, electrolytes of the present subject matter have high sparking voltage to insure anode barrier film stability, high conductivity to maintain capacitor energy efficiency, high dielectric constant to promote double layer capacitance, supporting electrolyte having mono or multi-charge cations with small ionic radius (compared to tertiary amine/quaternary ammonium currently used) to improve cathode double layer capacitance, and a pH adjusted solution for better electrolyte performance. FIG. 4A illustrates an electrolyte for an aluminum electrolytic capacitor, according to various embodiments. The cathode double layer 400 is shown at the boundary of the cathode 402 and the electrolyte 404 having ions 410. The cathode double layer capacitance is a function of solvent and solute interactions with the charged cathode. As discussed above, increased solvent dielectric constant, increased cation charge, and decreased cation ionic radius will increase the capacitance of the double layer, and hence the capacitor itself. FIG. 4B is a graphical illustration of cathode double layer capacitance using an improved electrolyte solution, according to some embodiments.

Figure 5:
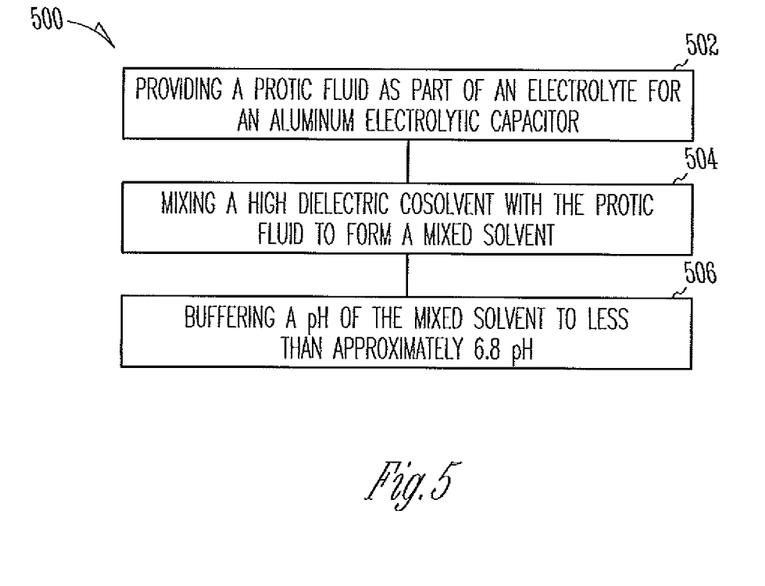
FIG. 5 illustrates a flow diagram of a method for manufacturing an electrolyte for an aluminum electrolytic capacitor, according to various embodiments.

FIG. 5 illustrates a flow diagram of a method for manufacturing an electrolyte for an aluminum electrolytic capacitor, according to various embodiments. An embodiment of the method 500 includes providing a protic fluid, at 502, and mixing a high dielectric co-solvent with the protic fluid to form a mixed solvent, at 504. At 504, a pH of the mixed solvent is buffered to less than approximately 6.8 pH using a buffering anionic agent, such as borate, in various embodiments. The method further includes mixing the high dielectric cosolvent with a supporting electrolyte, in various embodiments. The supporting electrolyte is selected for optimal cation size and charge and anion solubility. According to various embodiments, buffering a pH includes using a buffering anionic agent, such as borate. The electrolyte includes trialkylammonium carboxylates/dicarboxylates or quaternary ammonium carboxylates/dicarboxylates, in various embodiments. In an embodiment, the electrolyte includes an organic soluble supporting electrolyte, including all combinations of organic or inorganic anions soluble in solution, such as diiodosalicylate, tetrafluoroborate, or tetraborate and cations listed in the table above. One example of an organic soluble supporting electrolyte is lithium salicylate.

Figure 6:
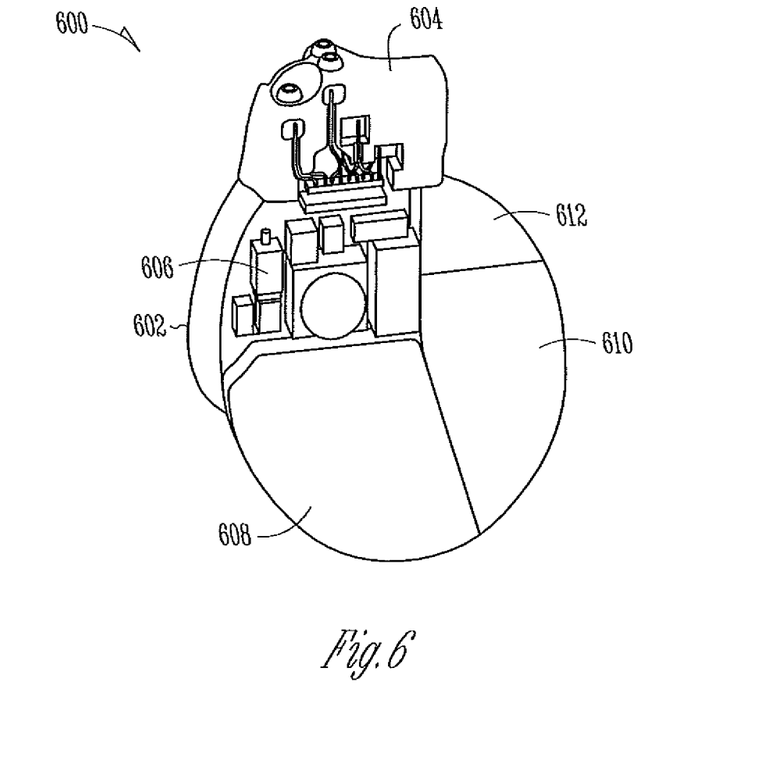
FIG. 6 illustrates an implantable medical system including a capacitor having an improved electrolyte solution, according to various embodiments.

FIG. 6 illustrates an implantable medical system including a capacitor having an improved electrolyte solution, according to various embodiments. The implantable medical system 600 includes a housing 602 and attached header 604. According to various embodiments, the housing 602 contains pulse control and communication electronics 606, a battery 608 and a storage capacitor 610. A capacitor manufactured using the present subject matter can provide the required energy storage capacity using a smaller volume. The present subject matter can reduce needed capacitor size by 15-20%, according to various embodiments. The depicted capacitor shows a 20% reduction in volume, which would reduce the volume by the amount shown at 612, in an embodiment. The present subject matter can reduce needed capacitor size by 15-20%, according to various embodiments.

The present subject matter provides advantages for capacitor applications that benefit from increased energy density. The increase in energy density results in a smaller package size, and thus provides benefits to implantable medical devices. However, any application that combines high voltage capacitive storage with small size requirements would benefit from the present subject matter.

This application is intended to cover adaptations or variations of the present subject matter. It is to be understood that the above description is intended to be illustrative and not restrictive. The scope of the present subject matter should be determined with reference to the appended claims, along with the full scope of legal equivalents to which such claims are entitled.

What is claimed is:

1. An electrolyte for an aluminum electrolytic capacitor, the electrolyte comprising:
 a protic fluid;
 a high dielectric co-solvent;
 a low ionic size cation; and
 an anion soluble in solution of mixed co-solvent, wherein the anion includes 3,5-diiodosalicylate, tetrafluoroborate, or acetate;
 wherein the electrolyte is pH buffered to less than approximately 6.8 pH.

2. The electrolyte of claim 1, wherein the protic fluid includes ethylene glycol.

3. The electrolyte of claim 1, wherein the high dielectric co-solvent includes N-methylformamide.

4. The electrolyte of claim 1, wherein a conductivity of the electrolyte is greater than 1.0 mS/cm.

5. The electrolyte of claim 1, further comprising a dipolar aprotic.

6. An electrolytic capacitor, comprising:
 an anode;
 a cathode; and
 an electrolyte provided between the anode and the cathode, the electrolyte including:
  a protic fluid including pyridine;
  a dipolar aprotic;
  a low ionic size cation; and
  an anion soluble in solution of mixed solvent;
  wherein the electrolyte is pH buffered to less than approximately 6.8 pH.

7. The electrolytic capacitor of claim 6, wherein the electrolyte further includes a high dielectric co-solvent.

8. The electrolytic capacitor of claim 6, wherein the low ionic size cation includes at least one of Li+, Mn(2+), Mg(2+), NH4+, Ba(2+), K+, Pb(2+), Sr(2+), La(3+), Ag+, Hg(2+), Ca(2+), Cd(2+), Na+, Cu+, Zn(2+), Fe(2+), Co(2+), Cu(2+), Ni(2+), Fe(3+), Ti(3+), Be(2+) or Al(3+).

9. An implantable device, comprising
 an implantable device housing;
 an electrolytic capacitor disposed in the implantable device housing, the capacitor including an electrolyte including:
  a protic fluid;
  a dipolar aprotic including pyridine;
  a low ionic size cation; and
  an anion soluble in solution of mixed solvent;
  wherein the electrolyte is pH buffered to less than approximately 6.8 pH; and
 pulse control electronics disposed in the implantable device housing and connected to the capacitor.

10. The implantable device of claim 9, wherein the implantable device includes a cardiac rhythm management device comprising electronics configured to provide for wireless communication with an external device.

11. The implantable device of claim 9, wherein the anion includes 3,5-diiodosalicylate.

12. The implantable device of claim 9, wherein the anion includes tetrafluoroborate.

13. The implantable device of claim 9, wherein the anion includes acetate.

14. A method of manufacturing an electrolyte for an aluminum electrolytic capacitor, the method comprising:
 providing a protic fluid;
 mixing a high dielectric co-solvent with the protic fluid to form a mixed solvent;
 mixing the mixed solvent with a supporting electrolyte including a low ionic size cation and an anion soluble in solution of mixed solvent, wherein the anion includes 3,5-diiodosalicylate, tetrafluoroborate, or acetate; and
 buffering a pH of the mixed solvent to less than approximately 6.8 pH using a buffering agent.

15. The method of claim 14, wherein buffering a pH includes using a buffering anionic agent.

16. The method of claim 15, wherein using a buffering anionic agent includes using borate.

17. The method of claim 14, wherein the electrolyte includes an organic soluble supporting electrolyte.

* * * * *